United States Patent [19]
Yokocho et al.

[11] Patent Number: 5,341,907
[45] Date of Patent: Aug. 30, 1994

[54] CENTRIFUGAL CLUTCH

[75] Inventors: Yoetsu Yokocho, Ome; Fujio Kobayashi, Hachioji, both of Japan

[73] Assignee: Kioritz Corporation, Tokyo, Japan

[21] Appl. No.: 40,029

[22] Filed: Mar. 30, 1993

[30] Foreign Application Priority Data

Apr. 20, 1992 [JP] Japan .................. 4-025210[U]

[51] Int. Cl.⁵ .................. F16D 13/14; F16D 43/18
[52] U.S. Cl. .................. 192/75; 192/105 CD; 267/155
[58] Field of Search .......... 192/105 CD, 105 CE, 192/105 BA, 105 BB, 75, 76; 267/155, 156; 188/184, 185

[56] References Cited

U.S. PATENT DOCUMENTS

| | | | |
|---|---|---|---|
| 1,665,714 | 4/1928 | Noble | 192/105 CD X |
| 2,301,849 | 11/1942 | Bialy | 192/105 CD |
| 2,596,193 | 5/1952 | Zieg | 192/105 CD X |
| 2,685,946 | 8/1954 | Pferd et al. | 188/184 |
| 3,135,842 | 6/1964 | Brailsford | 188/184 X |
| 3,224,541 | 12/1965 | Yamamoto | 192/105 CD |
| 3,712,438 | 1/1973 | Roddy et al. | |
| 3,779,355 | 12/1973 | Okuno | 188/185 X |
| 3,945,478 | 3/1976 | Kellerman et al. | |
| 4,227,601 | 10/1980 | Pilatowica | |
| 4,565,268 | 1/1986 | Yamamoto et al. | |
| 4,735,106 | 4/1988 | Yoshigai | 267/155 X |
| 4,960,194 | 10/1990 | Sageshima et al. | |

FOREIGN PATENT DOCUMENTS

| | | | |
|---|---|---|---|
| 803966 | 4/1951 | Fed. Rep. of Germany | 267/155 |
| 2205484 | 9/1972 | Fed. Rep. of Germany | 188/185 |
| 2342279 | 5/1974 | Fed. Rep. of Germany | 188/184 |
| 598056 | 12/1925 | France | 188/185 |
| 266236 | 11/1987 | Japan | |

*Primary Examiner*—Rodney H. Bonck
*Attorney, Agent, or Firm*—Browdy and Neimark

[57] ABSTRACT

A centrifugal clutch includes a spring consisting of a single wire member and adapted to hold a pair of clutch shoes in mutual relation to each other. With this simple structure, the centrifugal clutch helps to facilitate the production, assembly, etc. thereof and reduce the vibrations and noise during its operation. The spring, which consists of a single spring wire member, includes a pair of ring-shaped sections and a pair of clutch shoe holding sections extending in parallel each other and in opposite directions from each of the ring-shaped sections.

3 Claims, 2 Drawing Sheets

CENTRIFUGAL CLUTCH

BACKGROUND OF THE INVENTION

This invention relates to a centrifugal clutch and, in particular, to a centrifugal clutch of the type which includes: a clutch drum; a plurality of clutch shoes arranged within the clutch drum in such a way as to be radially moveable and adapted to be moved radially outwards by centrifugal force to come into frictional contact with the inner peripheral surface of the clutch drum; and a spring for biasing the clutch shoes radially inwards so as to normally keep them away from the inner peripheral surface of the clutch drum.

Generally speaking, in a centrifugal clutch of this type, a pair of swingable clutch shoes, each of which is rotatably supported at one end, are pulled toward the center of the clutch drum by an extension coil spring, as shown in FIG. 3, or annular coil springs arranged within circumferential grooves (not shown) formed in the clutch shoes. When applied to a portable working machine like a chain saw, such a centrifugal clutch involves, for example, the following problems: in the rotating speed range in which the centrifugal force acting on the extension coil springs is in excess of the mounting load of these springs, each extension coil spring suffers deformation due to the centrifugal force and thereby affects the movement of the clutch shoes, so that a smooth movement of the clutch shoes cannot be obtained. Further, a sliding-friction movement is caused in the extension coil springs, which accelerates the wear of these springs, resulting in a premature breakage of the extension coil springs and impairment of their durability.

SUMMARY OF THE INVENTION

It is accordingly an object of this invention to provide an inexpensive and reliable centrifugal clutch in which the above problems of the conventional centrifugal clutches experienced in using the extension coil springs are eliminated by forming the spring supporting the pair of clutch shoes from a single wire member and which exhibits a simple structure that facilitates the production, assembly, etc. thereof.

In accordance with this invention, there is provided a centrifugal clutch comprising a spring consisting of a single spring wire member and including a pair of ring-shaped sections and a pair of clutch shoe holding sections extending in parallel with each other and in opposite directions from each of the ring-shaped sections.

Thus, with the construction of the present invention, it is only necessary to provide a spring consisting of a single wire member having a pair of ring-shaped sections and a pair of clutch shoe holding sections extending in parallel with each other and in opposite directions from each of the ring-shaped sections, so that there is no need to provide as many springs as presently used with conventional clutch shoes. Further, since the pair of clutch shoes are held by a spring consisting of a single wire member, it is possible to control the pair of clutch shoes in mutual relation to each other, so that, as compared to the centrifugal clutch using individual extension coil springs, the vibrations and noise when letting the clutch in can be reduced and, at the same time, the assembly, disassembly, inspection, etc. of the centrifugal clutch is facilitated. Thus, an inexpensive centrifugal clutch can be provided which is able to prevent premature wear or breakage of the spring and which can be formed in a simplified structure using a reduced number of parts.

DESCRIPTION OF THE PREFERRED EMBODIMENT

Figure 1:
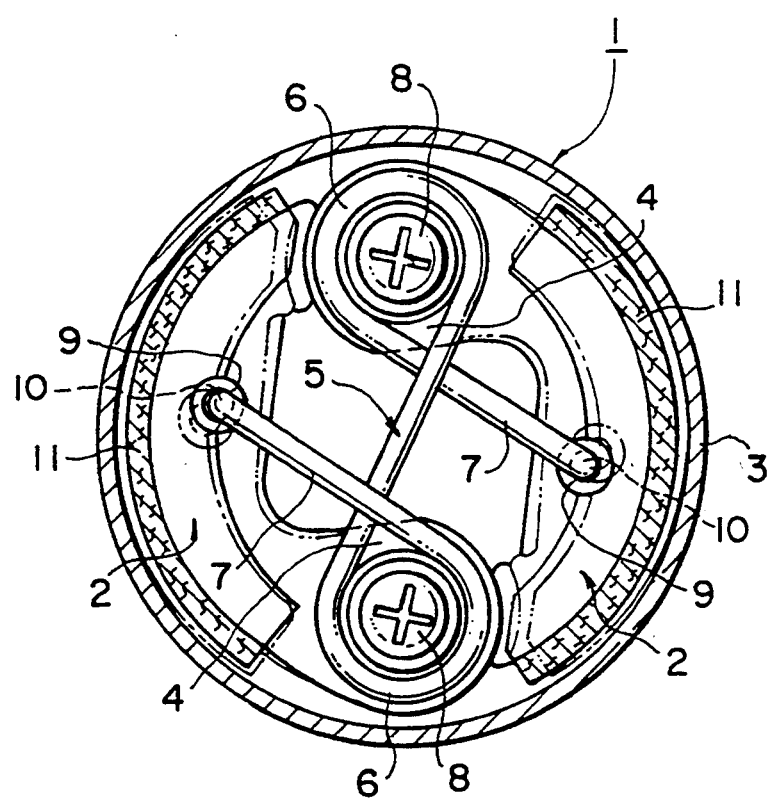
FIG. 1 is a front view showing the essential parts of a centrifugal clutch according to an embodiment of this invention.

FIG. 1 shows a centrifugal clutch according to the present invention, which is of a type suitable for use in the power transmission mechanism of a portable working machine like a chain saw, which requires transmission of torque at relatively high speed. Referring to the drawing, a centrifugal clutch 1 includes: a pair of clutch shoes 2, which are attached to the mounting boss of a driving-side member, for example, the output shaft (not shown) of an internal combustion engine; and a clutch drum 3, which is integrally attached to a driven-side member, such as the saw-chain driving sprocket (not shown) of a chain saw. The clutch shoes 2 and the clutch drum 3 are arranged coaxially with the above-mentioned output shaft and in such a way as to be independently rotatable. In this embodiment, each clutch shoe 2 has a clutch lining 11 which is firmly fixed to the outer peripheral surface thereof and which is to come into sliding contact with the inner peripheral surface of the clutch drum 3. One end portion 4 of each clutch shoe 2 is rotatably supported on the above-mentioned mounting boss (not shown) by a pivot 8, with a spring 5 being arranged between the pair of clutch shoes 2 in the manner described below.

The spring 5 consists of a single spring wire member having a diameter, for example, of approximately 3 mm and includes a pair of ring-shaped sections 6 and a pair of clutch shoe holding sections 7 extending straight, in parallel with each other and in opposite directions from each of the ring-shaped sections 6.

Figure 2A:
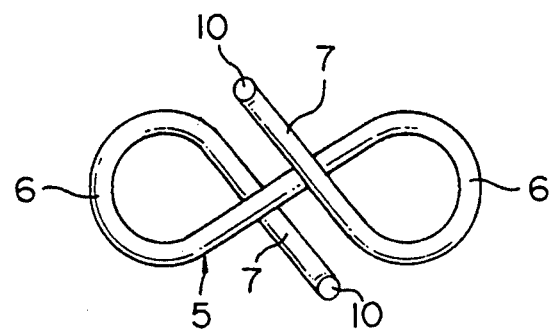
FIGS. 2A, 2B and 2C are a front view, a left-side view and a right-side view of the spring shown in FIG. 1.
Figure 2B:
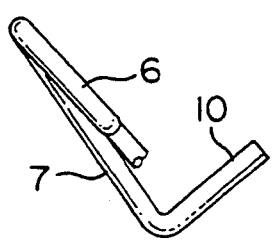
Figure 2C:
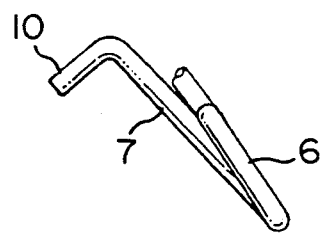
Figure 3:
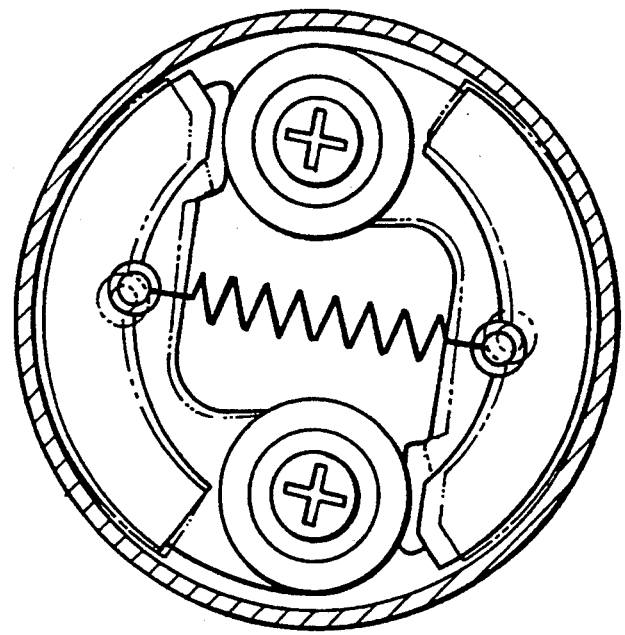
FIG. 3 is a front view showing the essential parts of a conventional centrifugal clutch.

As shown in FIGS. 2A, 2B and 2C, the spring 5 consists of a single spring wire member, which is bent so as to form the ring-shaped sections 6 and the clutch shoe holding sections 7. The free end portions of the clutch shoe holding sections 7, which are at the ends of the single spring wire member, are bent toward the above-mentioned output shaft to form attachment sections 10, which are inserted into holes 9 provided substantially in the middle of the clutch shoes 2.

Thus, when the driving shaft rotates clockwise (as seen in FIG. 1), the resulting centrifugal force causes each clutch shoe 2 to swing radially outwards around the pivot 8 at one end 4 thereof, so that the hole 9 formed in each clutch shoe 2 is moved outwardly, thereby causing the clutch shoe holding sections 7 of the spring 5 to move outwardly. As a result, the spring 5 receives a counterclockwise moment (as seen in FIG. 1). When the rotation of the driving shaft is decelerated or stopped, the centrifugal force is reduced, with the result that the spring 5 is restored clockwise to its original position by its own resilient force.

Although in the above embodiment the ring-shaped sections 6 are formed as onefold rings, it is also possible to wind the rings twofold, threefold or more depending upon the resilient force required.

What is claimed is:

1. A centrifugal clutch comprising; a clutch drum; a pair of clutch shoes each respectively pivoted at one end thereof to pivots of a drive member; and a spring consisting of a single spring wire member and including a pair of ring-shaped sections and a pair of a respective one of clutch shoe holding sections each being connected to a portion of said clutch shoes spaced from said one end, said pair of clutch shoe holding sections extending parallel to each other and in opposite directions from each of said ring-shaped sections.

2. The centrifugal clutch according to claim 1, wherein said pair of ring-shaped section are each substantially located in the same plane.

3. The centrifugal clutch according to claim 1, wherein each of said pair of ring-shaped sections is respectively mounted around each of one of said pivots.

* * * * *